United States Patent Office 2,745,828
Patented May 15, 1956

2,745,828

COPPER-CONTAINING AZO DYESTUFFS

Ernst Iselin, Dornach, and Walter Wehrli, Riehen, Switzerland, assignors to Sandoz A. G., Basel, Switzerland, a Swiss firm No Drawing. Application July 2, 1953,
Serial No. 365,773

Claims priority, application Switzerland July 9, 1952

8 Claims. (Cl. 260—146)

The present invention relates to copper-containing azo dyestuffs.

Valuable copper-containing azo dyestuffs are obtained, according to the present invention when one mol of the tetrazo compound of 3,3'-dialkoxy-4,4'-diamino-1,1'-diphenyl is, in any desired order of succession either:

(a) Coupled with one mol of an azine corresponding to the formula

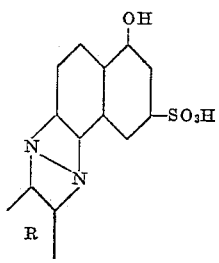

(I)

wherein R represents a mononuclear to trinuclear aromatic radical, and with one mol of an azo component containing the enolizable grouping —CO—CH$_2$—, and the resultant azo dyestuff treated with a copper-yielding agent, or (b) Coupled with one mol of a monoazo compound corresponding to the formula

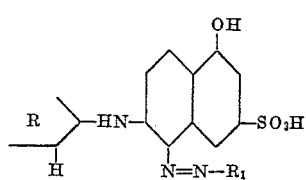

(II)

wherein R has the precedingly-recited significance, and R$_1$ stands for a radical of the benzene or naphthalene series, and with one mol of an azo component containing the enolizable grouping —CO—CH$_2$—, treating the resultant azo dyestuff with an acid agent in order to form the azine ring, and then treating with a copper-yielding agent in order to effect conversion into the copper complex compound.

The new dyestuffs are dark powders which, in concentrated sulfuric acid give a characteristic solution coloration, and which dye cotton and fibers of regenerated cellulose predominantly in neutral gray shades of excellent fastness to light and good fastness to washing and to perspiration. They correspond to the formula

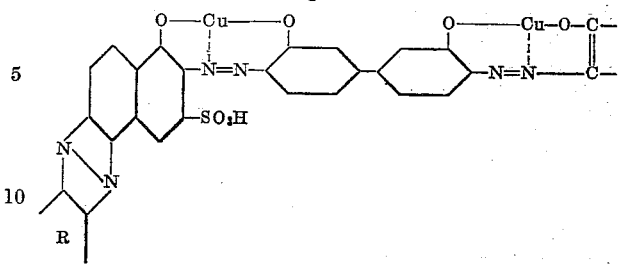

wherein R has the aforesaid significance, and wherein the enolized grouping

constitutes a part of the radical of a corresponding azo compound.

3,3'-dialkoxy-4,4'-diamino-1,1'-diphenyls, which are suitable for the preparation of the tetrazo compounds are preferably 3,3'-dimethoxy-4,4'-diamino-1,1'-diphenyl and 3,3'-diethoxy-4,4'-diamino-1,1'-diphenyl.

Illustrative of the azines of Formula I are for example the following:

5-hydroxy-1,2-naphthophenazine-7-sulfonic acid,
5 - hydroxy - 4' - methyl - 1,2,1',2' - naphthophenazine-7-sulfonic acid,
5 - hydroxy - 5' - methyl - 1,2,1',2' - naphthophenazine-7-sulfonic acid,
5 - hydroxy - 4' - methoxy - 1,2,1',2' - naphthophenazine-7-sulfonic acid,
5 - hydroxy - 5' - methoxy - 1,2,1',2' - naphthophenazine-7-sulfonic acid,
5 - hydroxy - 4' - chloro - 1,2,1',2' - naphthophenazine-7-sulfonic acid,
5 - hydroxy - 5' - chloro - 1,2,1',2' - naphthophenazine-7-sulfonic acid,
5 - hydroxy - 4' - carboxy - 1,2,1',2' - naphthophenazine-7-sulfonic acid,
5 - hydroxy - 5' - carboxy - 1,2,1',2' - naphthophenazine-7-sulfonic acid,
5 - hydroxy - 4' - hydroxy - 5' - carboxy - 1,2,1',2' - naphthophenazine-7-sulfonic acid,
5 - hydroxy - 4' - carboxy - 5' - hydroxy - 1,2,1',2' - naphthophenazine-7-sulfonic acid,
5 - hydroxy - 1,2,1',2' - naphthophenazine - 4',7 - disulfonic acid,
5 - hydroxy - 1,2,1',2' - naphthophenazine - 5',7 - disulfonic acid,
5,5' - dihydroxy - 1,2,2',1' - dinaphthazine - 7,7' - disulfonic acid, etc.

The azines are preferably prepared from orthoarylaminoazo compounds by treatment with acids (see H. E. Fierz-David, "Künstliche organische Farbstoffe," Berlin, Julius Springer, 1926, page 309). If the azines are made starting from meta-substituted arylaminoazo compounds, it appears for steric reasons that the position para to the substituent is involved in the ring closure, so that the meta-substituent is in the 5'-position.

Other azines which may be used in preparing the dyestuffs according to the present invention comprise inter alia the 5,5'-dihydroxy-1,2,1',2'-dinaphthazine-7,7'-disulfonic acid, obtained by the oxidation of 2-amino-5-hydroxynaphthalene-7-sulfonic acid with hypochlorite solution (Javelle water) and the 5-hydroxy-1,2,9',10'-naphthophenanthrazine-7-sulfonic acid, which can be prepared by condensation of 1,2-diamino-5-hydroxynaphthalene-7-sulfonic acid with 9,10-phenanthrenequinone.

Monoazo compounds of Formula II which can be employed in preparing the azo intermediates and in which an azine ring is then formed, comprise for example:

5 - hydroxy - 2 - phenyl - aminonaphthalene - 1,1' - azobenzene-4',7-disulfonic acid,
5 - hydroxy - 2 - phenyl - aminonaphthalene - 1,1' - azobenzene-3',7-disulfonic acid,
5 - hydroxy - 2 - (4'' - methyl) - phenyl - aminonaphthalene-1,1'-azobenzene-4',7-disulfonic acid,
5 - hydroxy - 2 - (3'' - methyl) - phenyl - aminonaphthalene-1,1'-azobenzene-4',7-disulfonic acid,
5 - hydroxy - 2 - (4'' - methoxy) - phenyl - aminonaphthalene-1,1'-azobenzene-4',7-disulfonic acid,
5 - hydroxy - 2 - (4'' - chloro) - phenyl - aminonaphthalene-1,1'-azobenzene-4',7-disulfonic acid,
5 - hydroxy - 2 - (3'' - chloro) - phenyl - aminonaphthalene-1,1'-azobenzene-3',7-disulfonic acid,
5 - hydroxy - 2 - (3'' - carboxy) - phenyl - aminonaphthalene-1,1'-azobenzene-7-sulfonic acid,
5 - hydroxy - 2 - (4'' - carboxy) - phenyl - aminonaphthalene-1,1'-azobenzene-7-sulfonic acid,
5 - hydroxy - 2 - (4'' - hydroxy - 5'' - carboxy) - phenyl-aminonaphthalene-1,1'-azobenzene-7-sulfonic acid,
5 - hydroxy - 2 - (4'' - carboxy - 5'' - hydroxy) - phenyl-aminonaphthalene-1,1'-azobenzene-7-sulfonic acid,
5 - hydroxy - 2 - phenyl - aminonaphthalene - 1,1' - azobenzene-4'',7-disulfonic acid,
5 - hydroxy - 2 - phenyl - aminonaphthalene - 1,1' - azobenzene-3'',7-disulfonic acid,
5,5' - dihydroxy - 2,2' - dinaphthylamine - 1, 1'' - azobenzene-7,7'-disulfonic acid,
5,5' - dihydroxy - 2,2' - dinaphthylamine - 1, 1'' - azobenzene-4'',7,7'-trisulfonic acid, etc.

Preferred azo components which contain the enolizable —CO—CH$_2$— grouping are the acylacetic acid arylamides and the 5-pyrazolones.

Additional suitable azo components, for the purposes of the present invention, comprise the acylacetonitriles, malonic acid derivatives, barbituric acid derivatives, benzoylacetone, 4-hydroxy-1-alkyl-2-quinolones, 4-hydroxy-1-cycloalkyl-2-quinolones, dihydroxyquinoline, etc. Suitable acylacetic acid arylamides comprise inter alia:

1-acetoacetylaminobenzene-4-sulfonic acid,
1-acetoacetylaminobenzene-3-sulfonic acid,
1-acetoacetylaminobenzene-4-carboxylic acid,
1-acetoacetylaminobenzene-3-carboxylic acid,
1-acetoacetylamino-4-hydroxybenzene-3-carboxylic acid,
1-acetoacetylamino-3-hydroxybenzene-4-carboxylic acid,
1-acetoacetylamino-2-methoxybenzene-4-sulfonic acid,
1-acetoacetylaminonaphthalene-3,6-disulfonic acid,
1-acetoacetylaminonaphthalene-3,8-disulfonic acid,
1-acetoacetylaminonaphthalene-4,8-disulfonic acid,
2-acetoacetylaminonaphthalene-4,8-disulfonic acid,
2-acetoacetylaminonaphthalene-5,7-disulfonic acid,
2-acetoacetylaminonaphthalene-6,8-disulfonic acid,
4-acetoacetylamino-1,1'-azobenzene-4'-sulfonic acid,
The acetoacetic acid amides of dehydrothio-p-toluidine-mono- and -di-sulfonic acids, etc.

Suitable 5-pyrazolones for the purposes of the present invention comprise inter alia:

1-phenyl-3-methyl-5-pyrazolone-3'-sulfonic acid,
1-phenyl-3-methyl-5-pyrazolone-4'-sulfonic acid,
1-phenyl-3-methyl-5-pyrazolone-3'-carboxylic acid,
1-phenyl-3-methyl-5-pyrazolone-4'-carboxylic acid,
1-phenyl-3-methyl-5-pyrazolone-2',5'-disulfonic acid,
1-phenyl-3-carboxy-5-pyrazolone-3'-sulfonic acid,
1-phenyl-3-carboxy-5-pyrazolone-4'-sulfonic acid,
1-phenyl-3-methyl-5-pyrazolone-3'-sulfonic acid amide,
1-phenyl-5-pyrazolone-3-carboxylic acid amide,
1-phenyl-3-carboxy-5-pyrazolone-3'-sulfonic acid amide,
1 - (2',5' - dichloro) - phenyl - 3 - methyl - 5 - pyrazolone-4'-sulfonic acid,
1-(1'-naphthyl)-3-methyl-5-pyrazolone-4'-sulfonic acid,
1-(1'-naphthyl)-3-methyl-5-pyrazolone-5'-sulfonic acid,
1-(1'-naphthyl)-3-methyl-5-pyrazolone-6'-sulfonic acid,
1-(1'-naphthyl)-3-methyl-5-pyrazolone-7'-sulfonic acid,
1-(1'-naphthyl)-3-methyl-5-pyrazolone-8'-sulfonic acid,
1-(2'-naphthyl)-3-methyl-5-pyrazolone-1'-sulfonic acid,
1-(2'-naphthyl)-3-methyl-5-pyrazolone-5'-sulfonic acid,
1-(2'-naphthyl)-3-methyl-5-pyrazolone-6'-sulfonic acid,
1-(2'-naphthyl)-3-methyl-5-pyrazolone-8'-sulfonic acid,
1 - (1' - naphthyl) - 3 - methyl - 5 - pyrazolone - 3',6'-disulfonic acid,
1 - (1' - naphthyl) - 3 - methyl - 5 - pyrazolone - 3',8'-disulfonic acid,
1 - (1' - naphthyl) - 3 - methyl - 5 - pyrazolone - 4',8'-disulfonic acid,
1 - (2' - naphthyl) - 3 - methyl - 5 - pyrazolone - 3',6'-disulfonic acid,
1 - (2' - naphthyl) - 3 - methyl - 5 - pyrazolone - 4',8'-disulfonic acid,
1 - (2' - naphthyl) - 3 - methyl - 5 - pyrazolone - 5',7'-disulfonic acid,
1 - (2' - naphthyl) - 3 - methyl - 5 - pyrazolone - 6',8'-disulfonic acid, etc.

The coupling of the tetrazo compounds of the 3,3'-dialkoxy-4,4'-diamino-1,1'-diphenyl with the azine (I) or the monoazo compounds (II) and the azo component containing the enolizable grouping —CO—CH$_2$—, can be carried out, according to the invention, in any suitable order of succession. If in the thus-obtained azo dyestuffs it is still necessary to form the azine ring, this is effected for example by dissolving and stirring the azo dyestuff in concentrated sulfuric acid or phosphoric acid at room temperature or by heating in dilute mineral acid to 80–100°C.

The conversion of the azine ring-containing azo dyestuffs into the copper complex compounds is carried out with splitting of the 3,3'-dialkoxy groups of the diphenyl radical. A particularly smooth conversion is obtained when the said splitting is effected by heating the dyestuff at or near the boiling temperature in an aqueous solution in the presence of the copper tetrammine complex compounds obtained from copper sulfate and ammonia, the splitting being carried out if desired in the presence of an organic base, or by heating in a melt prepared from copper sulfate and an alkali metal salt of a low molecular aliphatic monocarboxylic acid.

The following examples illustrate representative embodiments of the invention but are not intended to be limitative. In these examples the parts and percentages are by weight, and the temperatures are in degrees centigrade.

*Example 1*

24.4 parts of 4,4'-diamino-3,3'-dimethoxy-1,1'-diphenyl are tetrazotized and, while cooling with ice are coupled with 32.6 parts of 5-hydroxy-1,2-napthophenazine-7-sulfonic acid in the presence of sodium carbonate.

The resultant intermediate is precipitated by the addition of sodium chloride to the coupling solution and is filtered off. The thus-obtained concentrated paste is introduced, at a temperature of 0–10°, into a solution of 42.8 parts of the sodium salt of 1-(2'-naphthyl)-3-methyl-5-pyrazolone-6',8'-disulfonic acid, 200 parts of water and 100 parts of pyridine base mixture. Upon completion of the second coupling, the dyestuff is isolated, stirred into 1800 parts of water and, after the addition of 20 parts of sodium carbonate and 500 parts of an ammoniacal copper oxide solution which contains 50 parts of crystalline copper sulfate and 85 parts of concentrated aqueous ammonia solution, the resultant solution is heated to boiling under reflux for 6 to 12 hours. The thus-obtained copper complex compound is precipitated, filtered off and dried. It is a dark powder, which corresponds to the formula

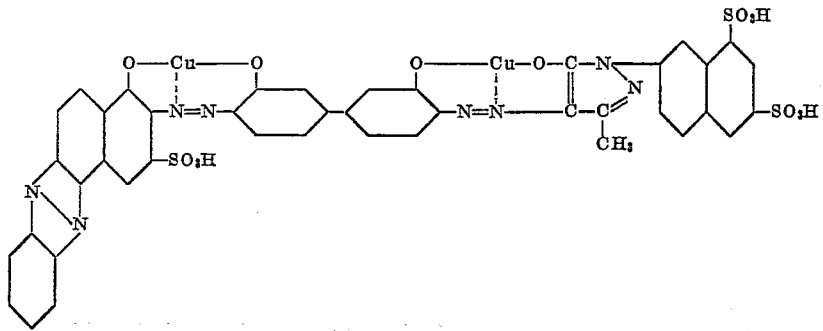

dissolves with reddish blue coloration in water and gray coloration in cencentrated sulfuric acid and dyes cotton and fibers of regenerated cellulose in beautiful neutral gray shades of good fastness to light, to washing and to perspiration.

The identical dyestuff is obtained when, in the foregoing, the 24.4 parts of 4,4'-diamino-3,3'-dimethoxy-1,1'-diphenyl are replaced by 27.2 parts of 4,4'-diamino-3,3'-diethoxy-1,1'-diphenyl.

*Example 2*

24.4 parts of 4,4'-diamino-3,3'-dimethoxy-1,1'-diphenyl are tetrazotized and, while cooling with ice, are coupled in the presence of sodium carbonate with 54.3 parts of the sodium salt of the monoazo dyestuff obtained by the acid coupling of diazotized 1-aminobenzene-4-sulfonic acid with 2-phenylamino-5-hydroxynaphthalene-7-sulfonic acid. The resultant intermediate is precipitated by the addition of sodium chloride to the coupling solution and is then filtered off. The well pressed filter cake is introduced into the solution of 42.8 parts of the sodium salt of 1-(2'-naphthyl)-3-methyl-5-pyrazolone-6',8'-disulfonic acid in 200 parts of water and 100 parts of pyridine base mixture. Upon conclusion of the coupling, the reaction product is separated and in order to produce an azine ring, is introduced into concentrated sulfuric acid, the resultant solution being stirred for 6 to 12 hours at room temperature (20–30°). Upon conclusion of the azine ring formation, the solution is poured into a mixture of ice and water, and the new dyestuff isolated therefrom as alkali metal salt. For conversion thereof into the copper complex compound, it is heated with a copper-yielding agent until the methoxy groups are split. The coppered dyestuff has the same composition and the same properties as the product described in Example 1.

*Example 3*

24.4 parts of 4,4'-diamino-3,3'-dimethoxy-1,1'-diphenyl are tetrazotized. For stabilization of the diazonium groups, 40 parts of naphthalene-2-sulfonic acid are scattered into the diazo solution. While cooling with ice, the tetrazo compound is coupled in the presence of sodium bicarbonate with 32.6 parts of 5-hydroxy-4'-methoxy-1,2,1',2'-naphthophenazine-7-sulfonic acid. The resultant intermediate is introduced into a solution of 43 parts of the sodium salt of 2-acetoacetylaminonaphthalene-5,7-disulfonic acid and 300 parts of water. In order to accelerate the coupling it is advantageous to add 150 parts of pyridine base mixture. The resultant disazo dyestuff is salted out and filtered off. The well pressed filter cake is then introduced into a melt of 350 parts of crystalline sodium acetate, 50 parts of crystalline copper sulfate and 20 parts of water, the melt heated and water distilled off until the temperature of 170° is reached. Boiling is then continued, under reflux for 6 to 12 hours whereby the methoxy groups in the diphenyl radical are split and the disazo dyestuff is coppered. Water is then added dropwise to the melt until all salts have dissolved but the dyestuff has not yet dissolved. The dyestuff is thereupon filtered off and dried. The new copper-containing disazo dyestuff is a black powder which corresponds to the formula

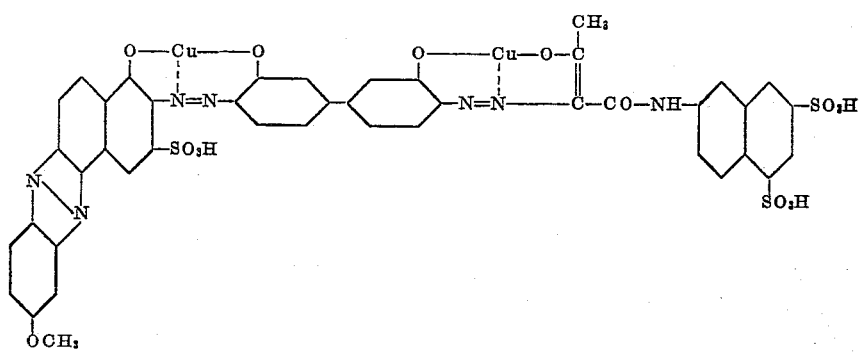

dissolves with reddish gray coloration in water and with gray coloration in concentrated sulfuric acid and dyes cotton and fibers of regenerated cellulose in neutral gray shades of good fastness to washing and to light.

*Example 4*

24.4 parts of 4,4'-diamino-3,3'-dimethoxy-1,1'-diphenyl are tetrazotized and, at a temperature of 0–5° and in presence of sodium carbonate, are coupled with 45 parts of the sodium salt of 5-hydroxy-1,2,1',2'-naphthophenazine-4',7-disulfonic acid in solution in 600 parts of water. Upon completion of the resultant intermediate formation, the solution of 27.6 parts of the sodium salt of 1-phenyl-3-methyl-5-pyrazolone-3'-sulfonic acid in 300 parts of water is run in. The coupling can be accelerated by the addition of 100 parts of pyridine base mixture to the mass. The resultant disazo dyestuff is salted out and isolated. Conversion thereof into the copper complex compounds can be effected, for instance according to one of the methods described in Examples 1 and 3. The new copper-containing azo dyestuff is a dark powder which corresponds to the formula

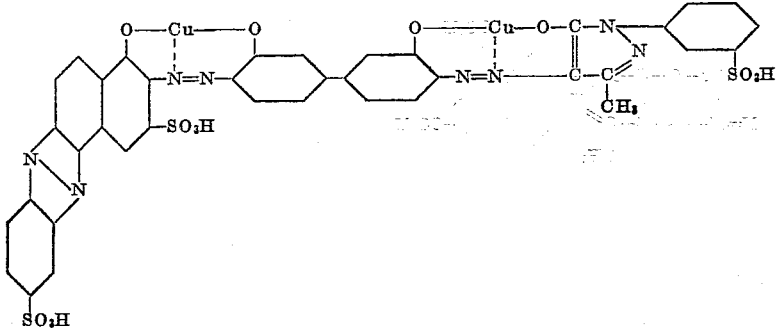

dissolves with reddish blue coloration in water and with blue coloration in concentrated sulfuric acid and dyes cotton and fibers of regenerated cellulose in pretty gray shades with very good fastness to light, to washing and to perspiration.

Example 5

To the aqueous solution of the intermediate from 24.4 parts of terazotized 4.4'-diamino-3,3'-dimethoxy-1,1'-diphenyl and 45 parts of sodium salt of 5-hydroxy-1,2,1',2'-naphthophenazine-4',7-disulfonic acid, obtained according to the indications in Example 4, there is added a solution of 27.9 parts of the sodium salt of 1-acetoacetylaminobenzene-2-sulfonic acid in 400 parts of water. When the coupling is over, the reaction product is separated, again stirred into 2000 parts of water and, after the addition of 25 parts of sodium carbonate and 500 parts of ammoniacal copper oxide solution which contains 50 parts of crystalline sulfate and 85 parts of concentrated aqueous ammonia solution, heated to boiling under reflux for 6 to 10 hours. The copper-containing disazo dyestuff, thus-produced, is precipitated, filtered off and dried. It is a dark powder which corresponds to the formula which dissolves with blue coloration in water and in concentrated sulfuric acid and which dyes cotton and fibers of regenerated cellulose in neutral gray shades with good fastness to light, washing and perspiration.

The following table sets forth examples of additional dyestuffs, which can be obtained by coupling 1 mol

TABLE

| Example No. | Azine | Azo component containing the enolizable grouping —CO—CH₂— | Dyeing of the copper complex compound on cotton |
|---|---|---|---|
| (1) | (2) | (3) | (4) |
| 6 | 5-hydroxy-3'-chloro-1,2,1',2'-naphthophenazine-7-sulfonic acid. | 1-phenyl-3-methyl-5-pyrazolone-2',5'-disulfonic acid. | Gray. |
| 7 | 5-hydroxy-4'-carboxy-1,2,1',2'-naphthophenazine-7-sulfonic acid. | 1-phenyl-3-methyl-5-pyrazolone. | Blue-gray. |
| 8 | 5,4'-dihydroxy-5'-carboxy-1,2,1',2'-naphthophenazine-7-sulfonic acid. | 1-phenyl-3-methyl-5-pyrazolone-4'-sulfonic acid. | Gray. |
| 9 | 5-hydroxy-4'-chloro-1,2,1',2'-naphthophenazine-7-sulfonic acid. | 1-(2'-naphthyl)-3-methyl-5-pyrazolone-5',7'-disulfonic acid. | Do. |
| 10 | 5,5'-dihydroxy-1,2,2',1'-dinaphthazine-7,7'-disulfonic acid. | 1-acetoacetylaminobenzene-3-sulfonic acid amide. | Do. |
| 11 | 5,5'-dihydroxy-1,2,1',2'-dinaphthazine-7,7'-disulfonic acid. | 1-acetoacetylaminobenzene-4-sulfonic acid. | Do. |
| 12 | 5-hydroxy-1,2,1',2'-naphthophenazine-4',7-disulfonic acid. | 1-phenyl-5-pyrazolone-3-carboxylic acid. | Blue-gray. |
| 13 | 5-hydroxy-1,2,1',2'-naphthophenazine-3',7-disulfonic acid. | 1-(3'-sulfamido)-phenyl-5-pyrazolone-3-carboxylic acid amide. | Do. |
| 14 | 5-hydroxy-1,2,1',2'-naphthophenazine-4',7-disulfonic acid. | 1-acetoacetylamino-4-hydroxybenzene-5-carboxylic acid. | Gray. |
| 15 | do | 1-acetoacetylaminobenzene-4-carboxylic acid. | Do. |
| 16 | 5-hydroxy-4'-amino-5'-carboxy-1,2,1',2'-naphthophenazine-7-sulfonic acid. | do | Do. |
| 17 | do | 1-phenyl-3-methyl-5-pyrazolone-4'-sulfonic acid. | Blue-gray. |
| 18 | 5-hydroxy-4'-amino-1,2,1',2'-naphthophenazine-5',7-disulfonic acid. | 1-phenyl-3-methyl-5-pyrazolone-3'-sulfonic acid. | Do. |

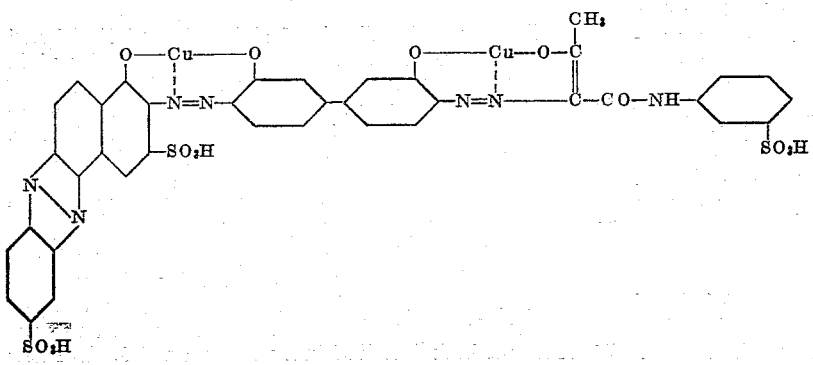

of tetrazotized 3,3'-dimethoxy-4,4'-diamino-1,1'-diphenyl with one mol of an azine and one mol of an azo component containing the enolizable —CO—CH₂— grouping, followed by coppering, essentially in accordance with the indications in the preceding examples.

The dystuff of Example 6, for instance, corresponds to the formula

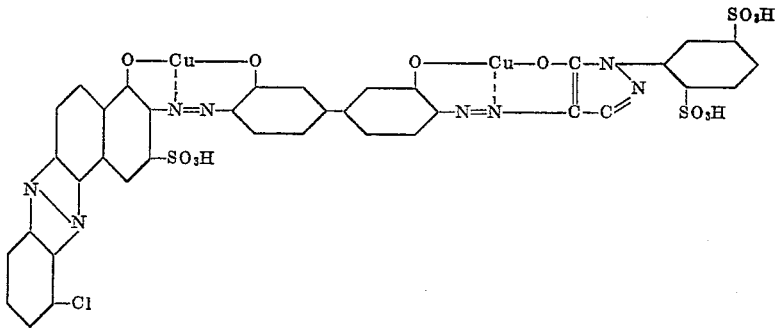

Example 19

0.1 part of any of the dyestuffs disclosed in the preceding examples is dissolved in 300 parts of water at 50°. 10 parts of cotton are entered into the dyeing bath; the latter is heated to 95° in the course of 15 to 20 minutes and maintained at this temperature for 30 minutes. In the course of the dyeing process, 1 to 4 parts of Glauber salt are added portionwise in the form of a 10% aqueous solution. The dyebath is then allowed to cool to 50°, the dyed material withdrawn, rinsed and dried. Depending upon the dyestuff employed, the product will be a blue-gray to gray dyeing of good fastness to light, to washing and to perspiration.

Fibers of regenerated cellulose are dyed in the same way.

Having thus disclosed the invention, what is claimed is:

1. Copper-containing azo dyestuffs which correspond to the formula

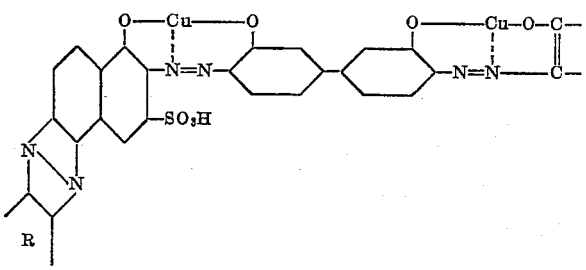

wherein R stands for a radical selected from the group consisting of the benzene and naphthalene series, and wherein the grouping

forms a part of the radical of an azo compound selected from the group consisting of the 1-aryl-5-pyrazolone and acetoacetylaminoaryl series.

2. Copper-containing azo dyestuffs which correspond to the formula

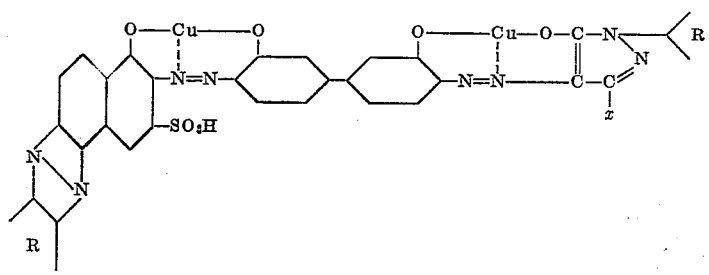

wherein each of the R's stands for a radical selected from the group consisting of the benzene and naphthalene series, and wherein $x$ stands for a member selected from the group consisting of —CH₃, —COOH and —CONH₂.

3. Copper-containing azo dyestuffs which correspond to the formula

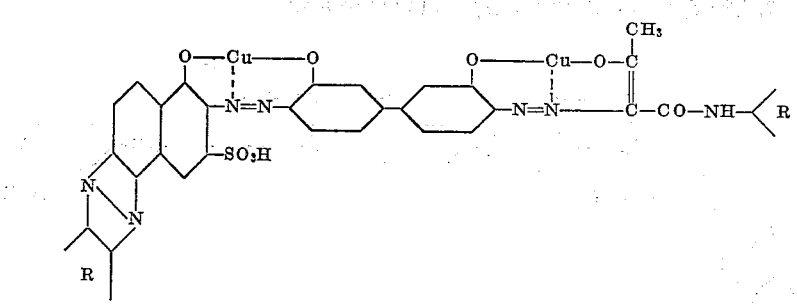

wherein each of the R's stands for a radical selected from the group consisting of the benezene and naphthalene series.

4. The dyestuffs which correspond to the formula
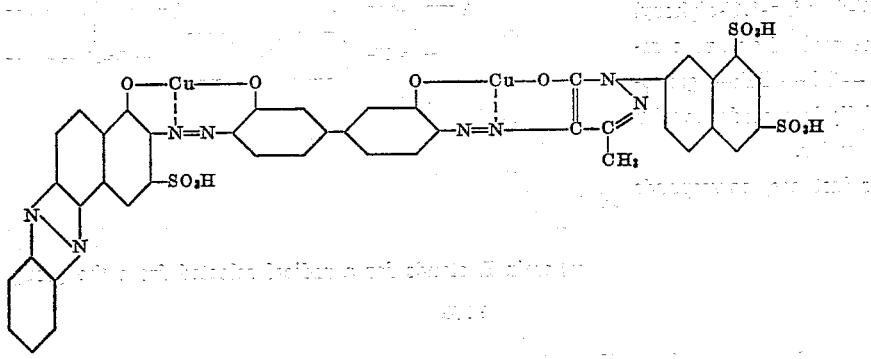
5. The dyestuffs which correspond to the formula
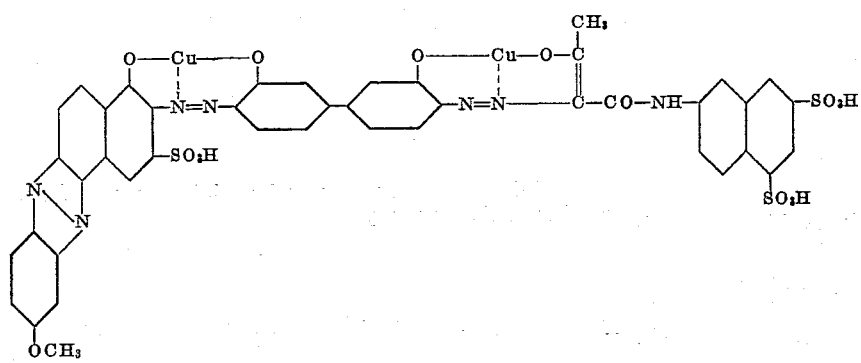
6. The dyestuffs which correspond to the formula
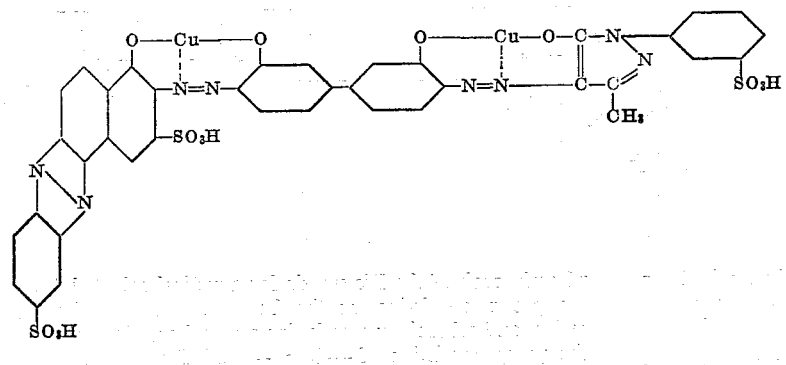
7. The dyestuffs which correspond to the formula
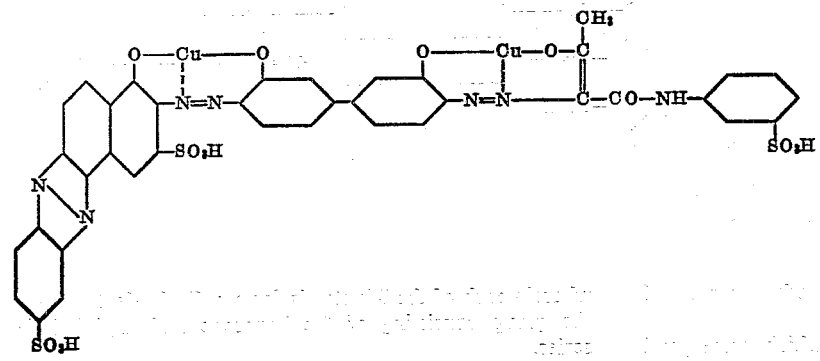

8. The dyestuffs which correspond to the formula
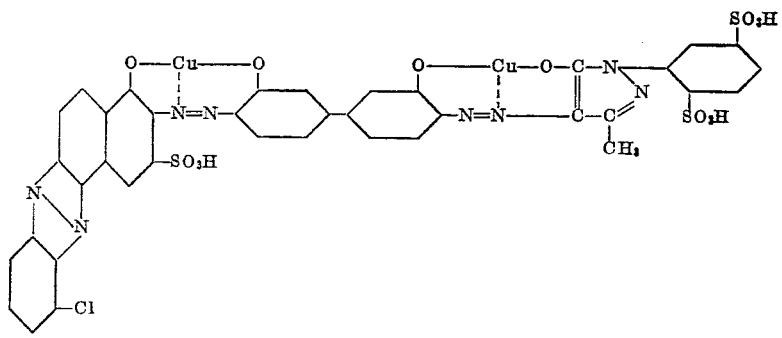
References Cited in the file of this patent
UNITED STATES PATENTS
| | | |
|---|---|---|
| 1,873,628 | Ohlendorf | Aug. 23, 1932 |
| 2,529,527 | Wehrli et al. | Nov. 14, 1950 |
| 2,598,126 | Iselin et al. | May 27, 1952 |